(12) United States Patent  (10) Patent No.: US 8,056,684 B2
Smith et al.  (45) Date of Patent: Nov. 15, 2011

(54) VEHICLE DRUM-IN-HAT DISC BRAKE ASSEMBLY AND METHOD FOR PRODUCING SAME

(75) Inventors: Daniel Smith, Livonia, MI (US); Antonio E. DeMorais, South Lyon, MI (US); Harry D. Miller, Canton, MI (US)

(73) Assignee: Kelsey-Hayes Company, Livonia, MI (US)

( * ) Notice: Subject to any disclaimer, the term of this patent is extended or adjusted under 35 U.S.C. 154(b) by 1265 days.

(21) Appl. No.: 11/731,013

(22) Filed: Mar. 29, 2007

(65) Prior Publication Data
US 2007/0227840 A1 Oct. 4, 2007

Related U.S. Application Data

(60) Provisional application No. 60/787,397, filed on Mar. 30, 2006.

(51) Int. Cl.
*F16D 65/00* (2006.01)
(52) U.S. Cl. ............... 188/206 A; 188/73.31; 188/18 A; 188/106 P
(58) Field of Classification Search ............ 188/206 R, 188/205 R, 206 A, 73.31, 18 A, 106 P
See application file for complete search history.

(56) References Cited

U.S. PATENT DOCUMENTS

| 3,476,224 | A | | 11/1969 | Buching |
| 4,854,423 | A | | 8/1989 | Evans et al. |
| 4,995,481 | A | | 2/1991 | Temple et al. |
| 5,038,899 | A | | 8/1991 | Weiler |
| 5,590,742 | A | | 1/1997 | Gutelius |
| 5,715,916 | A | * | 2/1998 | Fanelli et al. ............. 188/106 A |
| 5,865,275 | A | | 2/1999 | Anger et al. |
| 6,234,278 | B1 | * | 5/2001 | Loken et al. ............... 188/70 R |
| 6,360,852 | B1 | * | 3/2002 | Sherman et al. ............ 188/70 R |
| 6,382,368 | B2 | | 5/2002 | Iwata et al. |
| 6,681,902 | B1 | * | 1/2004 | Siekas et al. ............... 188/70 R |
| 6,729,444 | B1 | | 5/2004 | Schmandt et al. |
| 2005/0145451 | A1 | * | 7/2005 | Kelly et al. ................ 188/79.54 |
| 2008/0067020 | A1 | * | 3/2008 | Barbosa et al. ............. 188/325 |
| 2008/0149434 | A1 | * | 6/2008 | Barbosa et al. ............. 188/72.9 |

FOREIGN PATENT DOCUMENTS

DE  102 01 028 A1  7/2003

* cited by examiner

*Primary Examiner* — Bradley King
(74) *Attorney, Agent, or Firm* — MacMillan, Sobanski & Todd, LLC

(57) ABSTRACT

A vehicle drum-in-hat disc brake assembly comprises: a shield adapted to be secured to an axle flange; a drum brake portion carried by the shield; an abutment tower operatively disposed with the drum brake portion; and a caliper bracket assembly formed separate from the abutment tower and adapted to be secured to the axle flange; wherein at least one first fastener is provided for securing the abutment tower to the caliper bracket assembly and a plurality of second fasteners are provided for securing the caliper bracket assembly and the shield to the axle flange.

11 Claims, 15 Drawing Sheets

VEHICLE DRUM-IN-HAT DISC BRAKE ASSEMBLY AND METHOD FOR PRODUCING SAME

CROSS REFERENCE TO RELATED APPLICATIONS

This application claims the benefit of U.S. Provisional Application Ser. No. 60/787,397, filed Mar. 30, 2006.

BACKGROUND OF THE INVENTION

This invention relates in general to vehicle drum and disc brake assemblies and in particular to an improved structure for a vehicle drum-in-hat disc brake assembly and method for producing the same.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates which are selectively engaged by portions of a caliper assembly. The interior of the rotor defines a cylindrical braking surface.

A caliper assembly is slidably supported by pins secured to a mounting flange. The mounting flange is secured to a non-rotatable component of the vehicle, such as the steering knuckle or the axle flange. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. Each of the brake shoes has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner.

SUMMARY OF THE INVENTION

This invention relates to an improved structure for a vehicle drum-in-hat disc brake assembly and method for producing the same.

According to one embodiment, the vehicle drum-in-hat disc brake assembly comprises: a shield adapted to be secured to an axle flange; a drum brake portion carried by the shield; an abutment tower operatively disposed with the drum brake portion; and a caliper bracket assembly formed separate from the abutment tower and adapted to be secured to the axle flange; wherein at least one first fastener is provided for securing the abutment tower to the caliper bracket assembly and a plurality of second fasteners are provided for securing the caliper bracket assembly and the shield to the axle flange.

According to another embodiment, the method for producing a vehicle drum-in-hat disc brake assembly comprises the steps of: (a) providing an assembled drum brake assembly including a shield adapted to be secured to an axle flange of an axle, a drum brake portion carried by the shield, and an abutment tower operatively disposed with the drum brake portion; (b) providing a caliper bracket assembly formed separate from the abutment tower of the assembled drum brake assembly provided in step (a); (c) installing the assembled drum brake assembly on the axle; (d) installing a brake rotor on the axle; (e) installing the caliper bracket assembly on the axle; (f) providing at least one first fastener for securing the abutment tower to the caliper bracket assembly; and (g) providing a plurality of second fasteners for securing the caliper bracket assembly and the shield to the axle flange.

Other advantages of this invention will become apparent to those skilled in the art from the following detailed description of the invention, when read in light of the accompanying drawings.

DETAILED DESCRIPTION OF THE PREFERRED EMBODIMENTS

Figure 1:
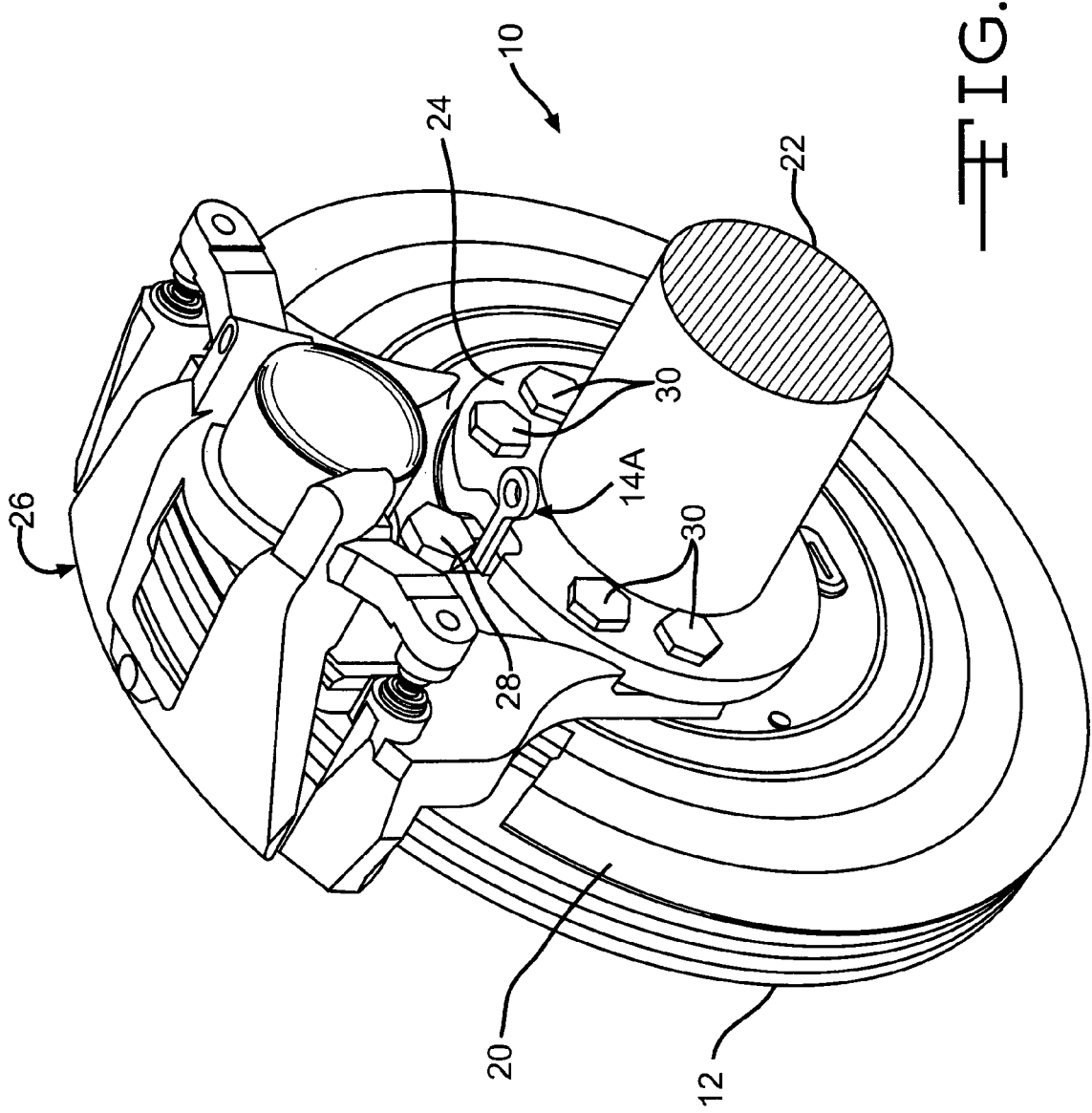
FIG. 1 is a perspective view of a portion of a first embodiment of a vehicle drum-in-hat disc brake assembly.
Figure 2:
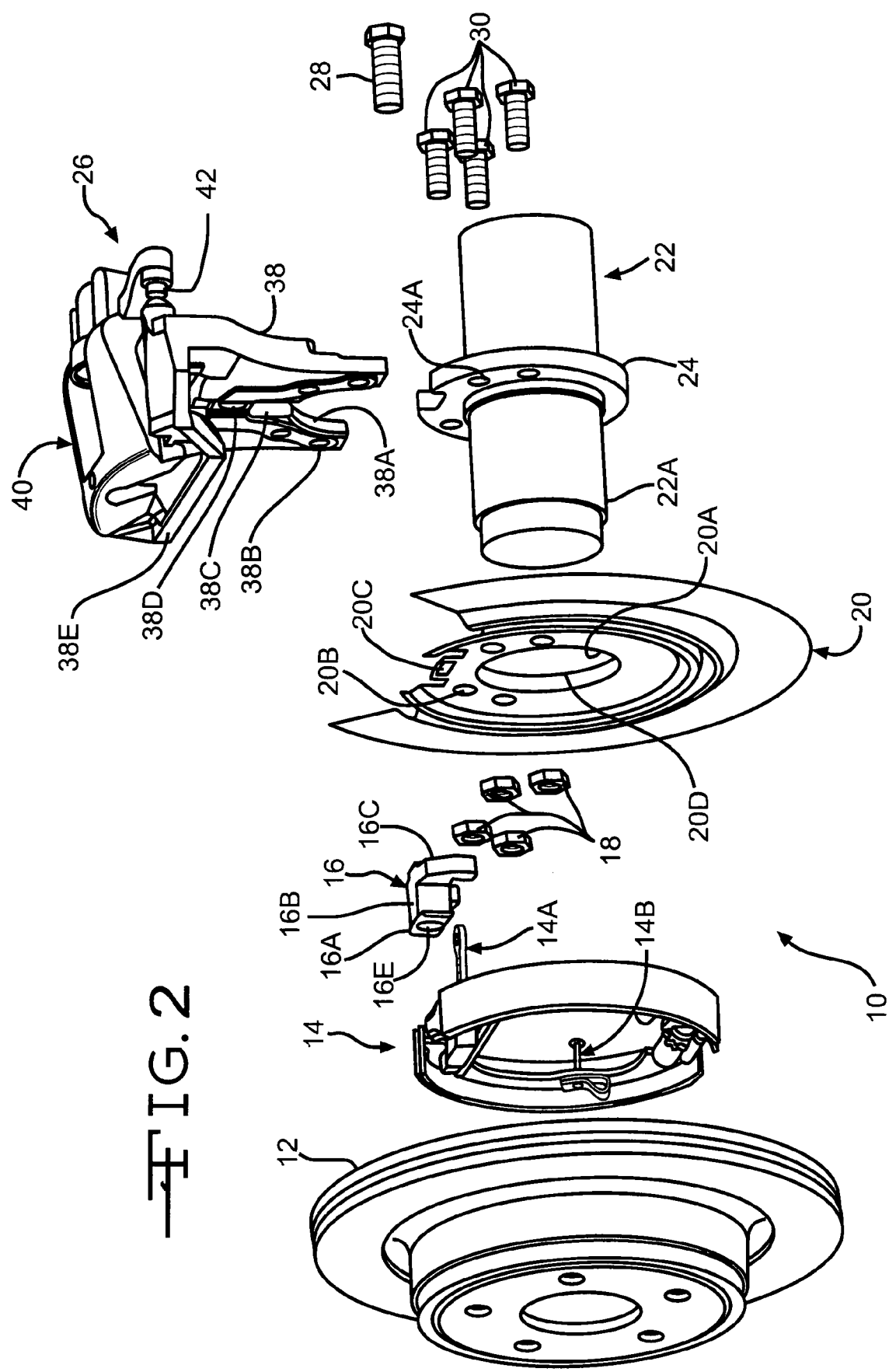
FIG. 2 is an exploded perspective view of selected components of the first embodiment of the vehicle drum-in-hat disc brake assembly illustrated in FIG. 1.

Referring now to the drawings, there is illustrated in FIGS. 1 and 2 a portion of a first embodiment of a vehicle drum-in-hat disc brake assembly, indicated generally at 10. The general structure and operation of the vehicle drum-in-hat disc brake assembly 10 is conventional in the art and thus, only those portions of the vehicle drum-in-hat disc brake assembly 10 which are necessary for a full understanding of this invention will be explained and illustrated. Although the invention will be described and illustrated in connection with the particular kind of vehicle drum-in-hat disc brake assembly 10 disclosed herein, it will be appreciated that the invention may be used in connection with other kinds of drum-in-hat disc brake assembly structures if so desired, such as for example, as shown in U.S. Pat. No. 5,180,037 to Evans and U.S. Pat. No. 6,729,444 to Schmandt et al., the disclosure of each of these patents incorporated by reference in entirety herein, and/or in connection with any other kind of drum-in-hat disc brake assemblies, such as for example, single piston, twin or multiple piston, opposed piston and non-opposed piston kinds of assemblies.

As shown in one or both of FIGS. 1 and 2, the illustrated first embodiment of the vehicle drum-in-hat disc brake assembly 10 includes the following components: a brake rotor 12; a drum brake portion 14; an abutment tower 16; nuts 18; a shield 20; an axle 22; an axle flange 24; a single piston caliper-bracket assembly 26; an abutment tower bolt 28; and mounting bolts 30.

In the illustrated embodiment, the abutment tower 16 is preferably formed as a one piece casting and includes a first flanged outer end 16A, a main body 16B, and an opposite second flanged inner end 16C. The inner end 16C is provided with a key 16D (best shown in FIG. 6), and with a threaded opening 16E which extends outwardly toward the outer end 16A. As will be discussed below, the key 16A will assist in helping locate the abutment tower 16 into the caliper-bracket assembly 26 and the threaded opening 16B is provided to accommodate the abutment tower bolt 28. Also, the key and slot design may assist in bearing parking brake torque loads. As shown in this embodiment, in FIG. 3 the drum brake portion 14 will fit into the abutment tower 16 as shown therein. Alternatively, the construction, shape and/or make-up of the abutment tower 16 may be other than illustrated and described if so desired.

In the illustrated embodiment, the shield 20 includes a generally centrally located circular hole 20A, a plurality of smaller holes 20B, a slotted hole 20C, and a protrusion 20D. In the illustrated embodiment, the shield 20 is provided with four smaller holes 20B. Preferably, the nuts 18 are fastened to the shield 20 by suitable means, such as for example, by welding. Alternatively, the nuts 18 may not be fastened to the shield 20 if so desired. In the illustrated embodiment, the drum brake portion 14 is carried or supported on the shield 20 by a pair of pivot pin clip assemblies 14B.

Figure 3:
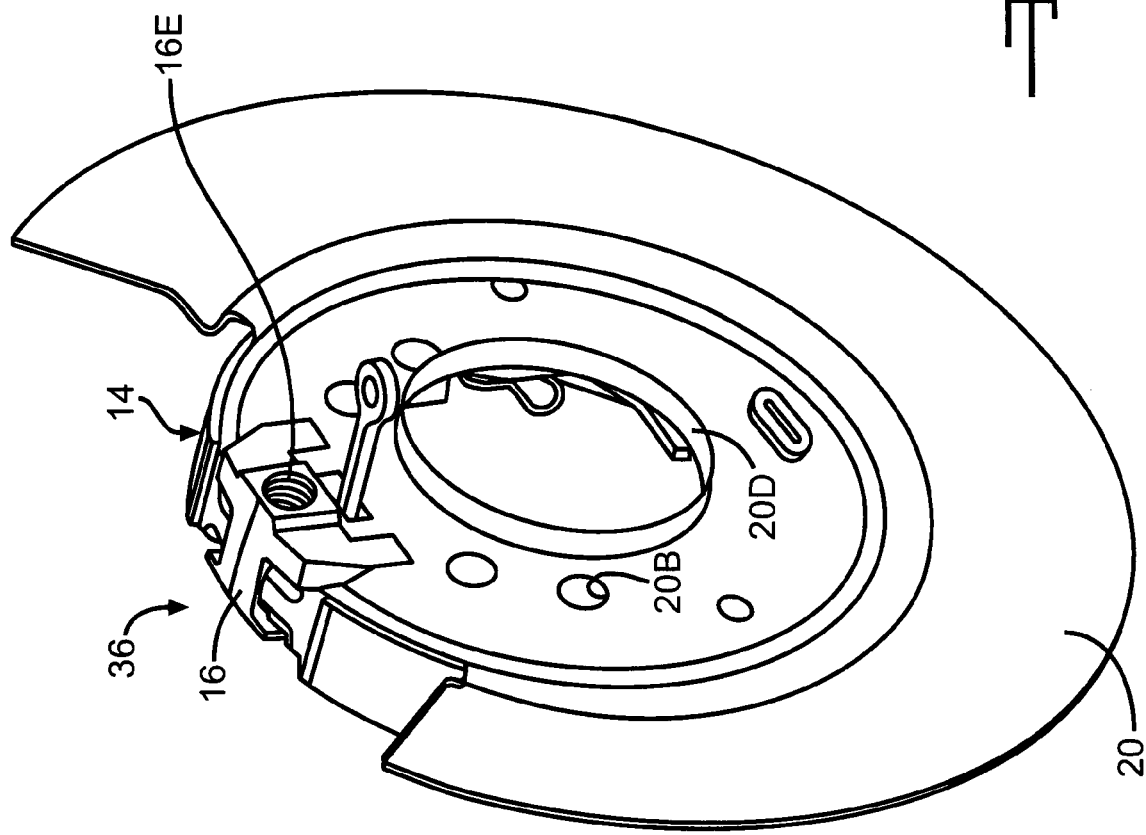
FIG. 3 is a view of selected components of the first embodiment of the vehicle drum-in-hat disc brake assembly illustrated in FIGS. 1 and 2 partially assembled.
Figure 4:
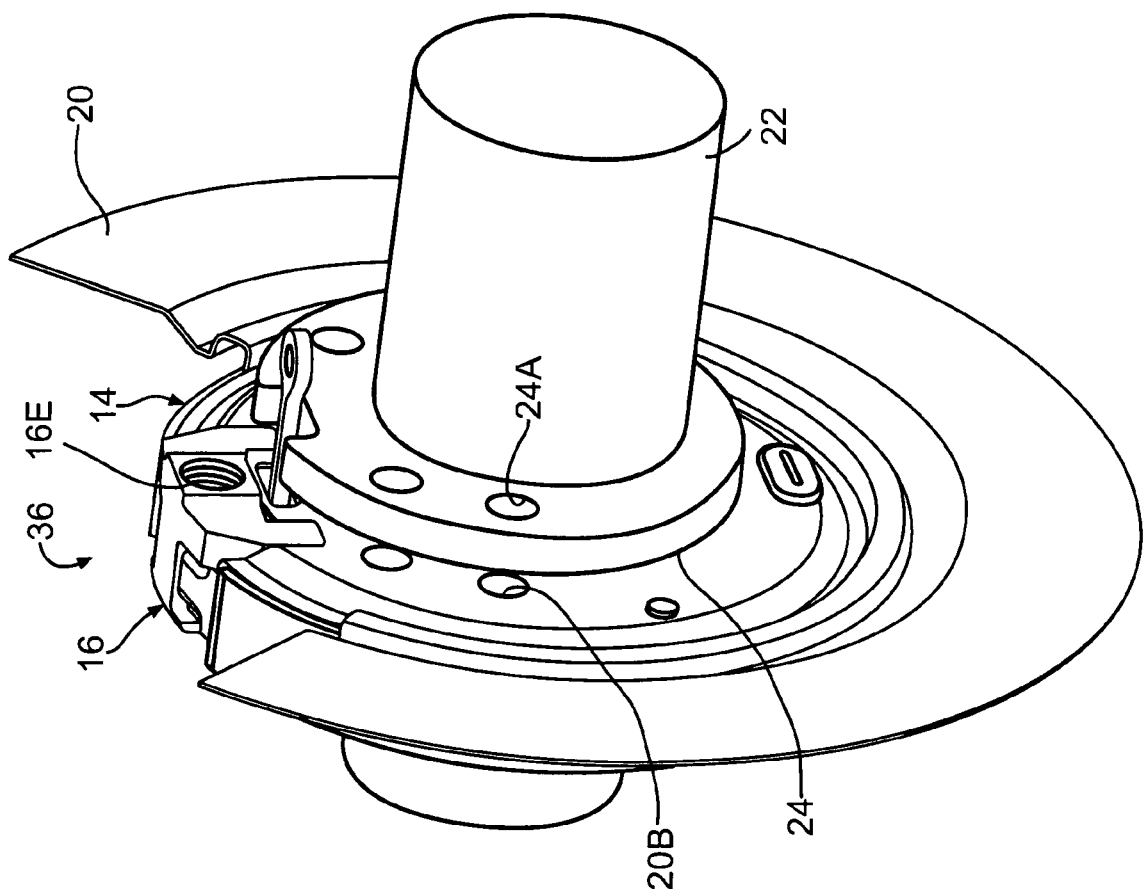
FIG. 4 is a view of partially selected components of the first embodiment of the vehicle drum-in-hat disc brake assembly illustrated in FIGS. 1 and 2 partially assembled.

Also, as illustrated in this embodiment, the shield 20 is preferably crimped to the abutment tower 16 to assist in locating the assembled drum brake assembly, indicated generally at 36 in FIGS. 3 and 4, the components of which will be discussed below. Alternatively, the shield 20 may be fastened or secured to the abutment tower 16 by other suitable means if so desired. Alternatively, the construction, shape and/or make-up of the shield 20 may be other than illustrated and described if so desired.

In the illustrated embodiment, the axle flange 24 is secured to the axle tube 22 by suitable means, such as for example, by welding, and is provided with a plurality of holes 24A. In the illustrated embodiment, the axle flange 24 is provided with four holes 24A. As will be discussed below, a respective one of each of the holes 24A of the axle flange 24 is coaxial with a respective one of each of the holes 20B of the shield 20. Alternatively, the construction, shape and/or make-up of the axle 20 and/or the axle flange 24 may be other than illustrated and described if so desired.

In the illustrated embodiment, the caliper bracket assembly 26 includes a caliper bracket 38 and a single piston caliper assembly, indicated generally at 40.

The caliper bracket 38 is preferably formed as a one piece casting and is provided with a generally semi-circular hole 38A and a plurality of smaller holes 38B. In the illustrated embodiment, the hole 38A is provided to allow the caliper bracket 38 to be disposed about the axle 22. In the illustrated embodiment, the caliper bracket 38 is provided with four smaller holes 38B. As will be discussed below, a respective one of each of the holes 38B of the caliper bracket 38 is coaxial with a respective one of each of the holes 24A and 20B of the axle flange 24 and the shield 20, respectively. Also, the caliper bracket 38 is provided with a slot 38C and a hole 38D located generally in the center of the slot 38C and an integrally formed outer tie bar 38E. Alternatively, the construction, shape and/or make-up of the caliper bracket 38 may be other than illustrated and described if so desired.

The single piston caliper assembly 40 is secured to the caliper bracket 38 by suitable means. In the illustrated embodiment, the single piston caliper assembly 40 is slidably secured to the caliper bracket 38 by guide pins 42 (one of the guide pins 42 illustrated in FIG. 2). Alternatively, the construction, shape and/or make-up of the caliper assembly 40 and/or the securement of the caliper assembly 40 to the caliper bracket 38 may be other than illustrated and described if so desired.

Figure 5:
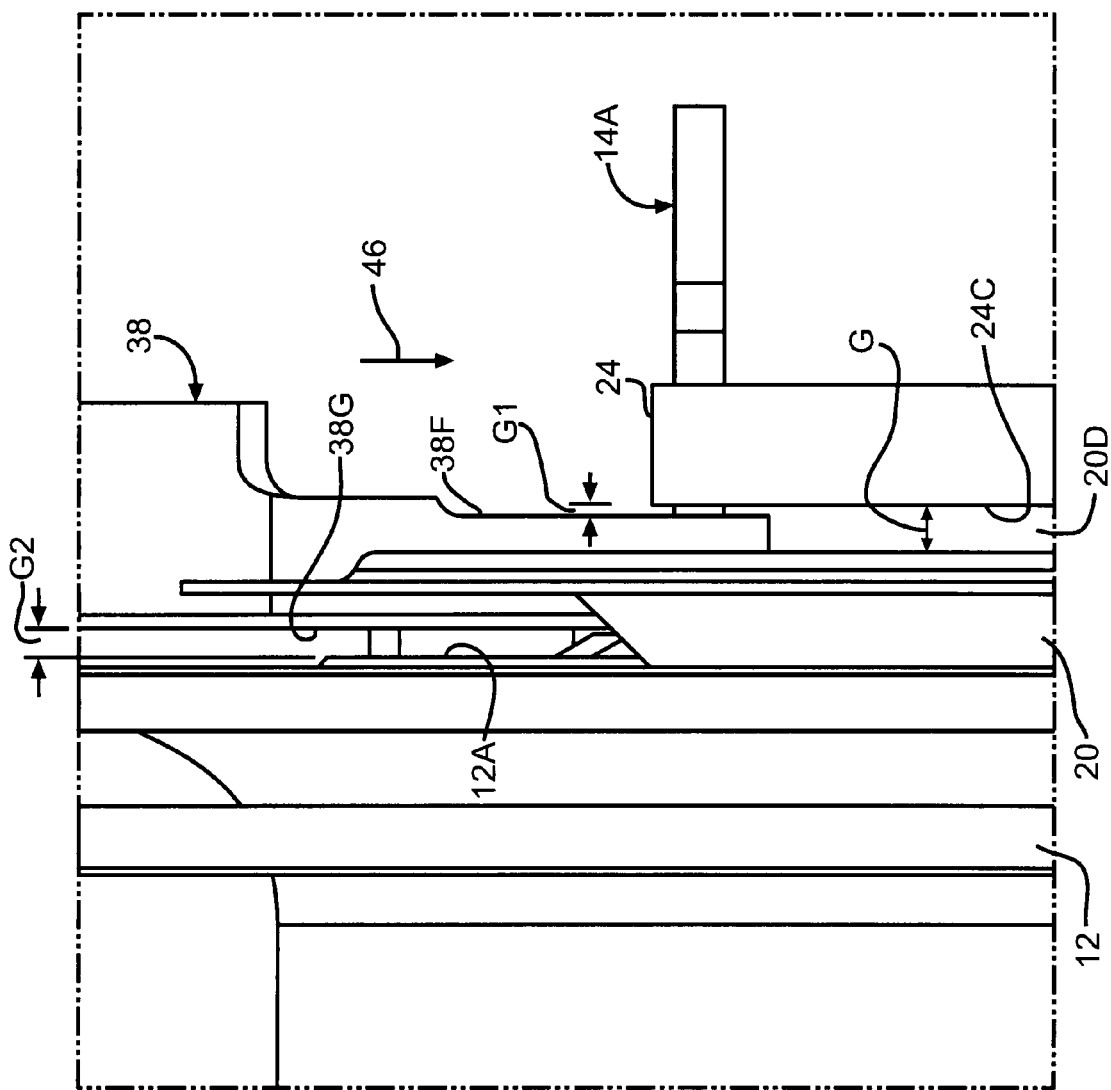
FIG. 5 is another view of the partially assembled components illustrated in FIG. 4.
Figure 7:
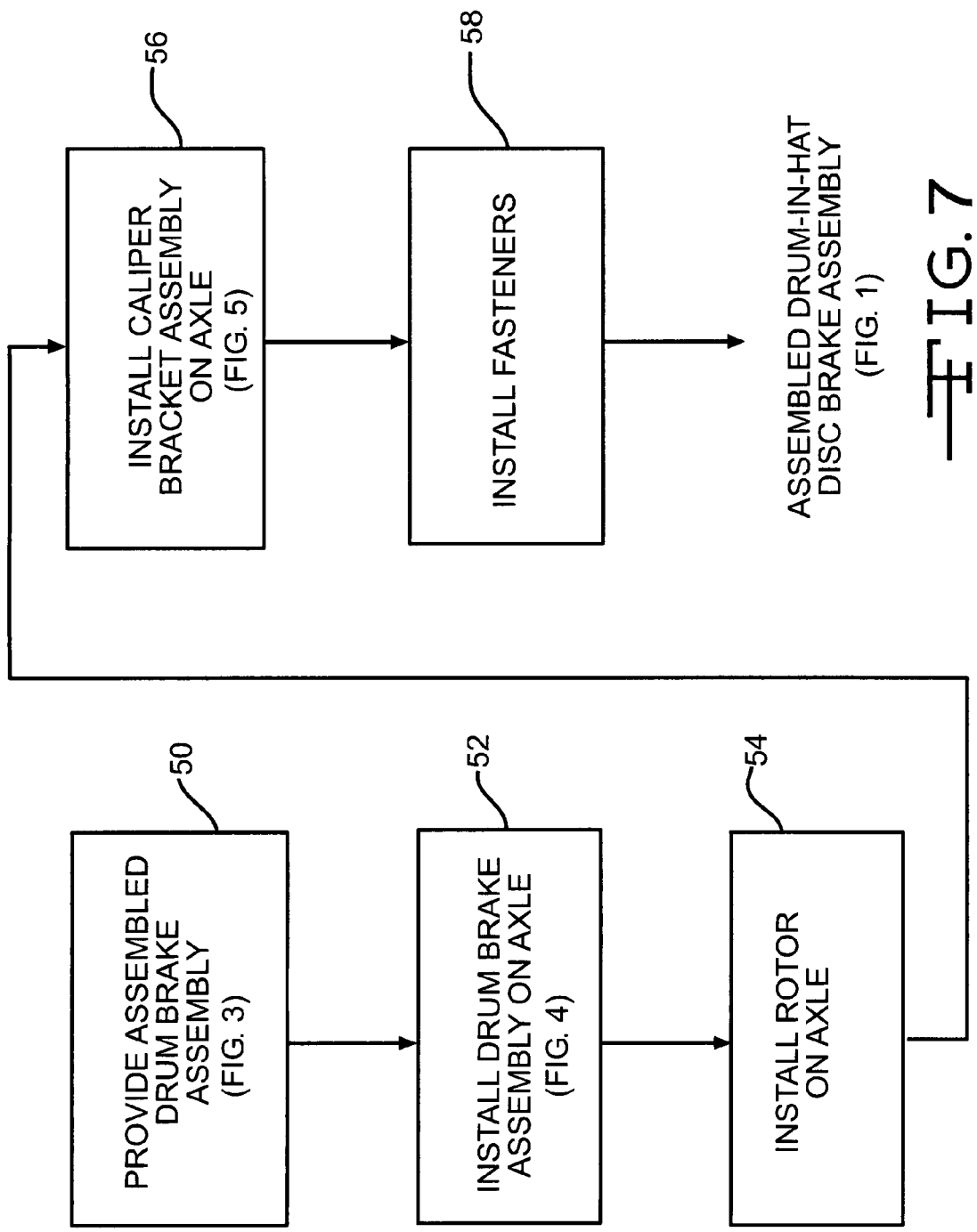
FIG. 7 illustrates an embodiment of a sequence of installation steps for producing the first embodiment of the vehicle drum-in-hat disc brake assembly illustrated in the above drawing figures.

Turning now to FIG. 7, there is illustrated an embodiment of a sequence of installation steps for producing the first embodiment of the vehicle drum-in-hat disc brake assembly 10 illustrated in FIGS. 1 and 2. First, in step 50 and as shown in FIG. 3, the assembled drum brake assembly 36, which includes the components of the shield 20, the drum brake portion 14 and the abutment tower 16 assembled together by suitable means, is provided. Next, in step 52 and as shown in FIG. 4, the assembled drum brake assembly 36 is guided over the axle 22 and moved therealong until it contacts the axle flange 24, as shown in FIG. 4. Preferably, to accomplish this in the illustrated embodiment, as best shown in FIG. 5, the drum brake assembly 36 is advanced until the protrusion 20D of the shield 20 contacts or engages (i.e., snaps onto), a ledge or protrusion 24B provided on the axle flange 24. As a result of this, this ensures that the brake rotor 12 and the shield 20 are prevented from being placed too near the axle flange 24 and thereby providing a desired clearance or gap G, shown in FIG. 5, for the subsequent installation of the caliper bracket assembly 26 as will be discussed below. Alternatively, the shield 20 can clip or otherwise be attached to the axle flange 24. Also, alternatively, a similar "protrusion like" feature (not shown) may be added to the inside of the brake rotor 12 to assist in locating the drum brake shoes of the drum brake portion 14 and/or to prevent the drum brake assembly from extending too deep into the brake rotor 12.

Next, in step 54, the brake rotor 12 is installed over a wheel hub portion or outer end 22A of the axle flange 22 and advanced thereon. As a result of this, the drum brake portion 14 and a portion of the abutment tower 16 of the drum brake assembly 36 fit inside the brake rotor 12 after the rotor 12 has been assembled during step 54.

Figure 6:
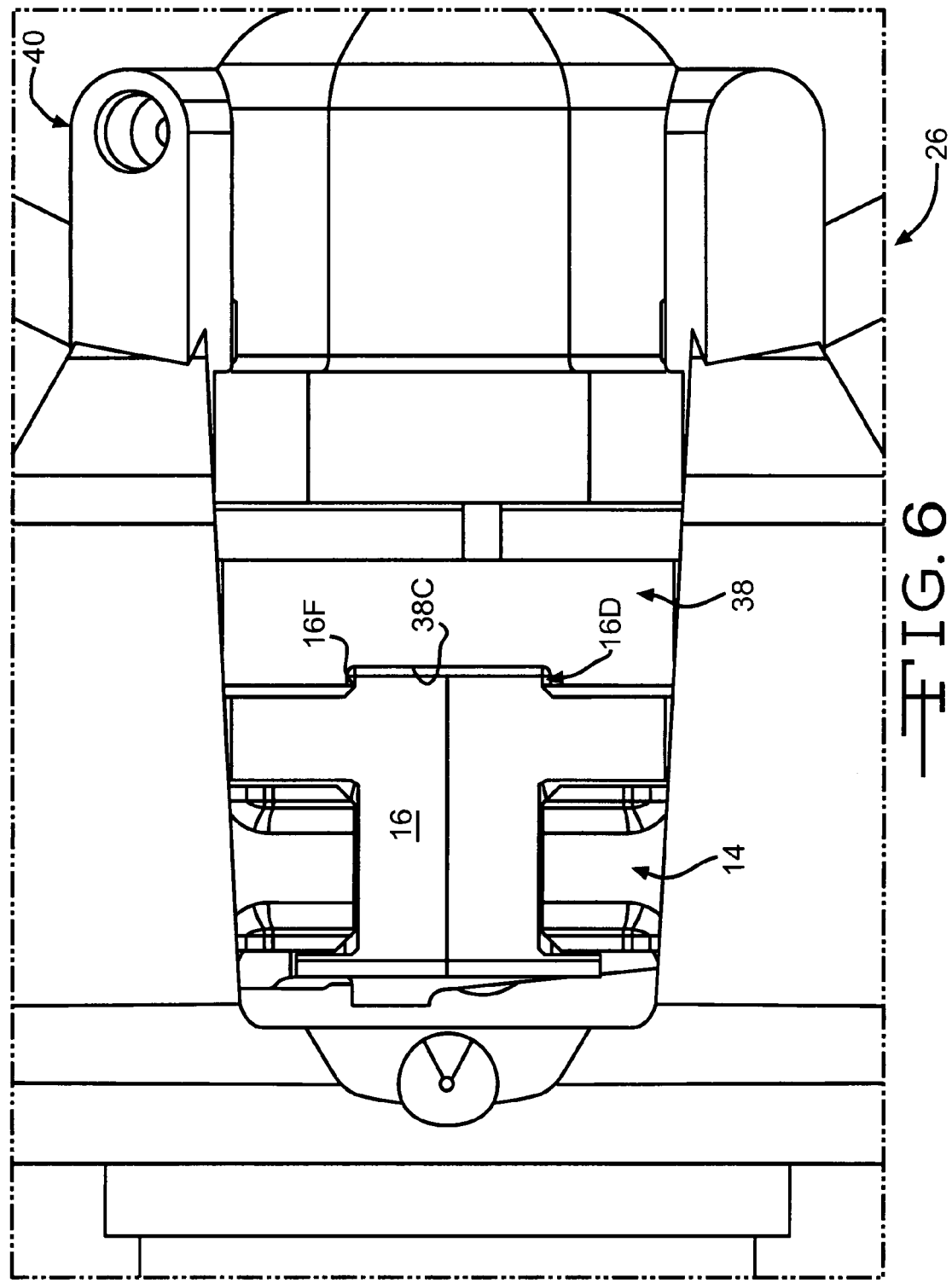
FIG. 6 is a view in the direction of arrow 6-6 of a portion of the first embodiment of a vehicle drum-in-hat disc brake assembly illustrated in FIG. 1.

Following this, in step 56 the caliper-bracket assembly 26 is assembled by moving or "dropping" the caliper-bracket assembly 26 onto the axle 22 between the brake rotor 12 and the axle flange 24, in the direction of arrow 46 as shown in FIG. 5. As can be realized, in order to accomplish this, the abutment tower 16 had to be separate from the caliper bracket assembly 26 in order for the caliper bracket assembly 26 to fit over the brake rotor 12. As can be seen in FIG. 2, the slot 38C, which is preferably in this embodiment is an as cast slot, is provided in the caliper bracket 38 so that the caliper bracket assembly 26 can drop in and over a link and lever arm, indicated generally at 14A, of the drum brake portion 14 during assembly until the caliper bracket assembly 26 reaches its desired final installed position, as shown in FIGS. 1 and 6. Also, as best shown in FIG. 5, in the illustrated embodiment there is preferably a slight clearance or gap G1 between an inboard surface 38F of a lower portion of the caliper bracket 38 and an outboard surface 24C of the axle flange 24, and a slight clearance G2 between an outboard surface 38G of the caliper bracket 38 and the inboard surface 12A of the brake rotor 12 following steps 54 and 56.

Next, in step 58, the abutment tower bolt 28 and the mounting bolts 30 are installed to complete the vehicle drum-in-hat disc brake assembly 10, as shown in FIG. 1. To accomplish this in the illustrated embodiment, the mounting bolts 30 extend through the openings 24A provided in the axle flange 24, the openings 38B provided in a bracket 38 of the caliper-bracket assembly 26, the openings 20B provided in the shield 20, and are threadably received into the nuts 18 to thereby secure the caliper bracket assembly 26 and drum brake assembly 36 in place on the axle 22. The abutment tower bolt 28 extends through hole 38D of the caliper bracket assembly 26 and is threadably received in the threaded hole 16B of the abutment tower 16. It is understood that any number of bolts 28 may be used in a desired array to secure the abutment tower 16 to the caliper bracket assembly 26; any number of bolts 30 may be used in a desired array to secure the caliper bracket assembly 26, the axle flange 24 and the shield 20 together; and that the shape of one or more of components of the vehicle drum-in-hat disc brake assembly 10, such as for example, the axle flange 24, the shield 20, the caliper bracket assembly 26 and the abutment tower 16, may be other than illustrated if so desired.

FIG. 6 is a view of selected components of the drum-in-hat disc brake assembly 10 without the brake rotor 12 being shown. As shown therein, in this embodiment the abutment tower 16 preferably is provided with a feature that will help locate it in the slot 38C of the caliper bracket 38 as it is installed. In the illustrated embodiment, the feature is the key 16D which will be guided in the slot 38E by tapered edges 16F thereof. Alternatively, it is understood that other key shapes and/or other suitable means or structures may be used to assist in the guiding or mating of the abutment tower 16 to the caliper bracket assembly 26. FIG. 6 shows the abutment tower 16 in the fully installed position after it has been pulled tightly to the caliper bracket assembly 26 by the bolt 28. Also, depending upon the particular vehicular application, a wheel hub (not shown) may also be provided on the axle 22. Alternatively, the construction, make-up and or configuration of one or more of the components of the first embodiment of the vehicle drum-in-hat disc brake assembly 10 may be other than illustrated if so desired.

Figure 8A:
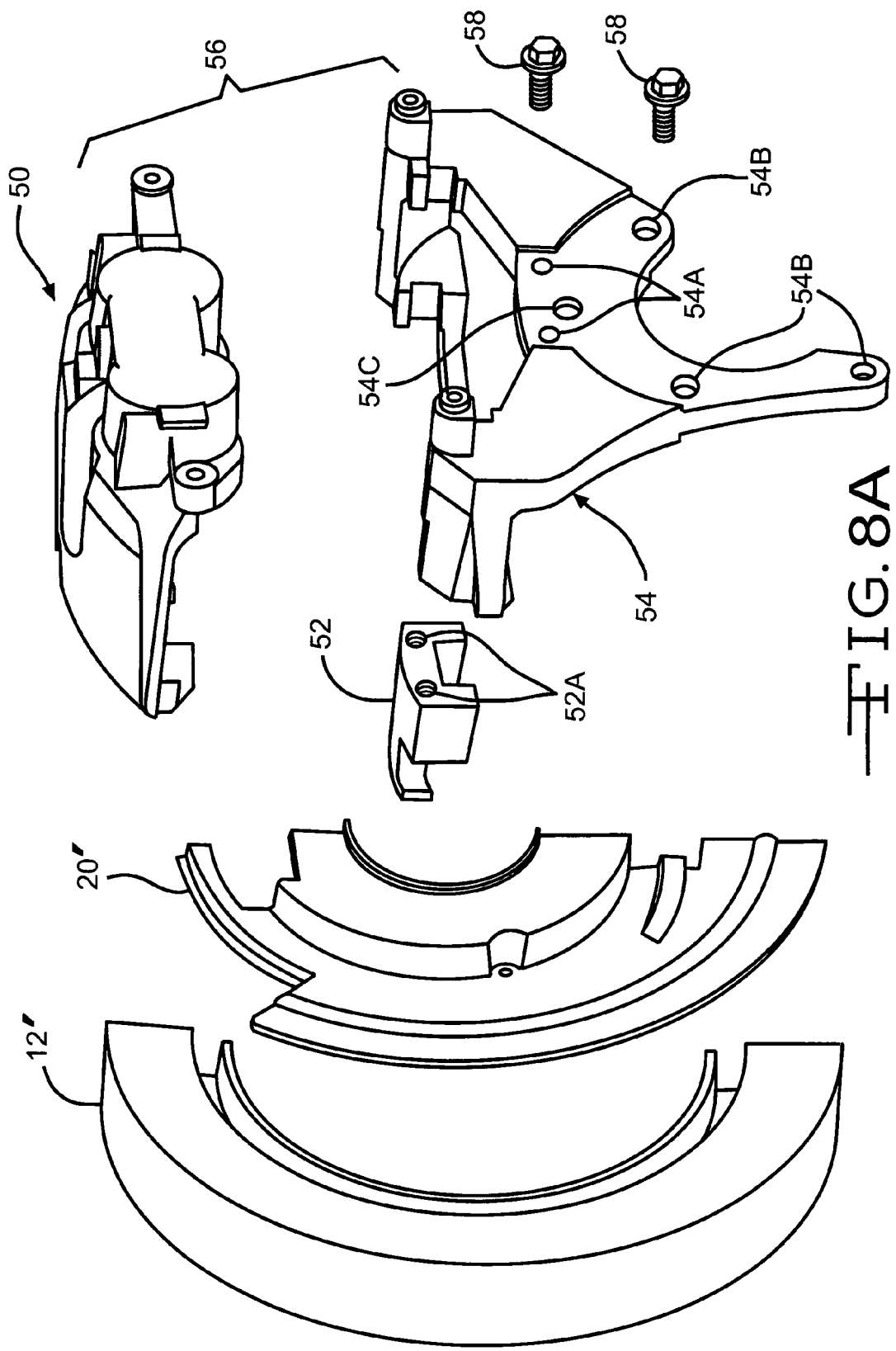
FIG. 8A is an exploded perspective view of selected components of a second embodiment of a vehicle drum-in-hat disc brake assembly.

Referring now to FIG. 8A and using like reference numbers to indicate similar parts, there is illustrated a view of selected components of a second embodiment of a vehicle drum-in-hat disc brake assembly, indicated generally at 50. In this embodiment, the drum-in-hat disc brake assembly 50 includes an abutment tower 52 which is secured to a caliper bracket 54 of a twin piston caliper-bracket assembly 56 by two bolts 58 (with the selected components of the twin-piston caliper bracket assembly 56 which are shown being shown disassembled). The bolts 58 extend through openings 54A provided in the bracket 54 and are received in threaded openings 52A provided in the abutment tower 52. Also, in this embodiment, the caliper bracket 54 includes three openings 54B which are adapted to receive the bolts 30 as discussed above in connection with the first embodiment of the drum-in-hat disc brake assembly 10 shown in FIGS. 1 and 2. In this embodiment, a brake rotor 12' and a shield 20' are only partially shown. Further, the caliper bracket 54 includes an opening 54C formed therein. The opening 54C is adapted to allow a portion of the link and lever arm 14A of the drum brake portion 14 discussed above in connection with the first embodiment of the drum-in-hat disc brake assembly shown in FIGS. 1 and 2, to extend therethrough. Alternatively, the caliper bracket 54 may include a slot or cut-out to accommodate the associated link and lever arm 14A. Alternatively, the construction, make-up and or configuration of one or more of the components of the second embodiment of the vehicle drum-in-hat disc brake assembly 50 may be other than illustrated if so desired.

Figure 8B:
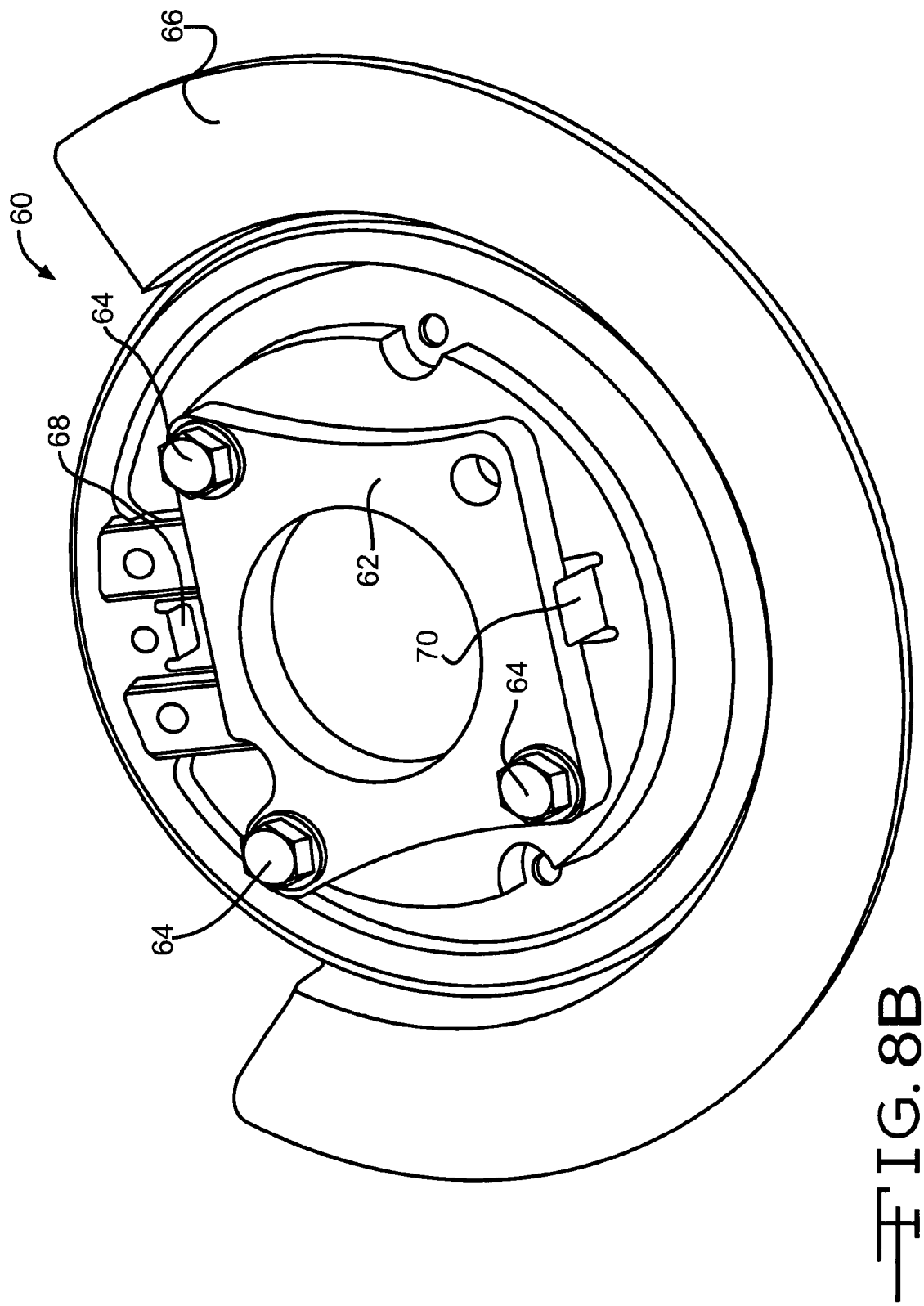
FIG. 8B is a perspective view of selected components of a third embodiment of a vehicle drum-in-hat disc brake assembly.

Referring now to FIG. 8B and using like reference numbers to indicate similar parts, there is illustrated a view of selected components of a third embodiment of a vehicle drum-in-hat disc brake assembly, indicated generally at 60. In this embodiment, the bracket (not shown) of the associated caliper bracket assembly (not shown) is secured to an axle flange 62 using three bolts 64. Also, in this embodiment, a shield 66 is provided with a first "outwardly" bent tab 68 and a second "inwardly" bent tab 70. The first outwardly bent tab 68 is provided on a shield 66 to assist in locating an associated abutment tower (not shown) relative thereto. The second inwardly bent tab 70 is provided on the shield 66 to assist in locating the shield 70 (and therefore the associated brake drum assembly (not shown)), onto the associated axle flange (not shown) and also to prevent the "clocking" of the drum brake assembly during assembly. Alternatively, the construction, make-up and or configuration of one or more of the components of the third embodiment of the vehicle drum-in-hat disc brake assembly 60 may be other than illustrated if so desired.

Figure 9:
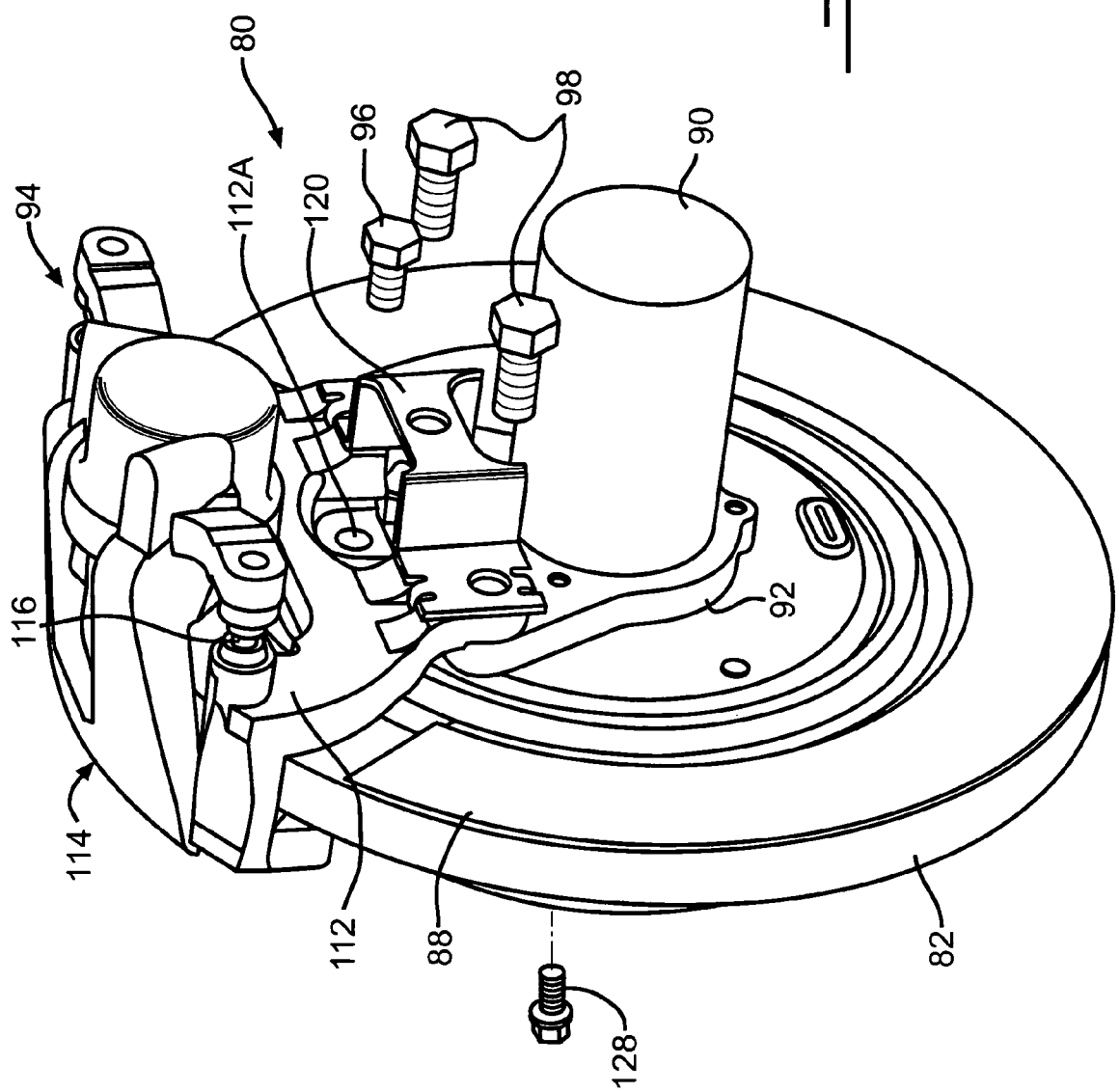
FIG. 9 is a perspective view of a portion of a fourth embodiment of a vehicle drum-in-hat disc brake assembly.

Referring now to FIG. 9 there is illustrated a perspective view of a portion of a fifth embodiment of a vehicle drum-inhat disc brake assembly, indicated generally at 80. As shown therein, the illustrated fifth embodiment of the vehicle drum-in-hat disc brake assembly 80 includes the following components: a brake rotor 82; a drum brake portion 84 (shown in FIGS. 12 and 13); an abutment tower 86 (shown in FIG. 10); a shield 88; an axle 90; an axle flange 92; a single piston caliper bracket assembly 94; an abutment tower bolt 96; and mounting bolts 98.

Figure 10:
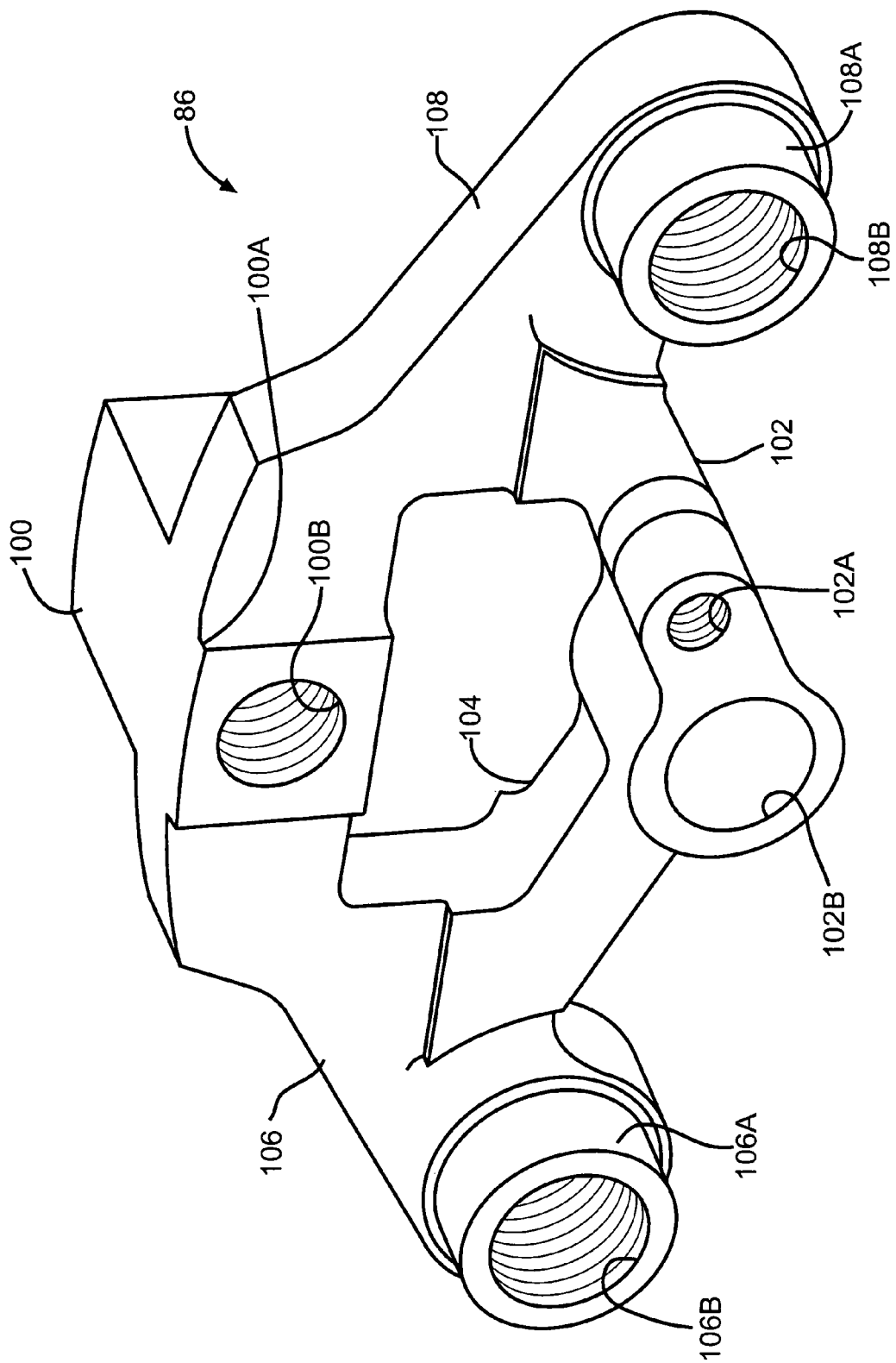
FIG. 10 is a perspective view of a selected component of the fourth embodiment of a vehicle drum-in-hat disc brake assembly illustrated in FIG. 9.
Figure 11:
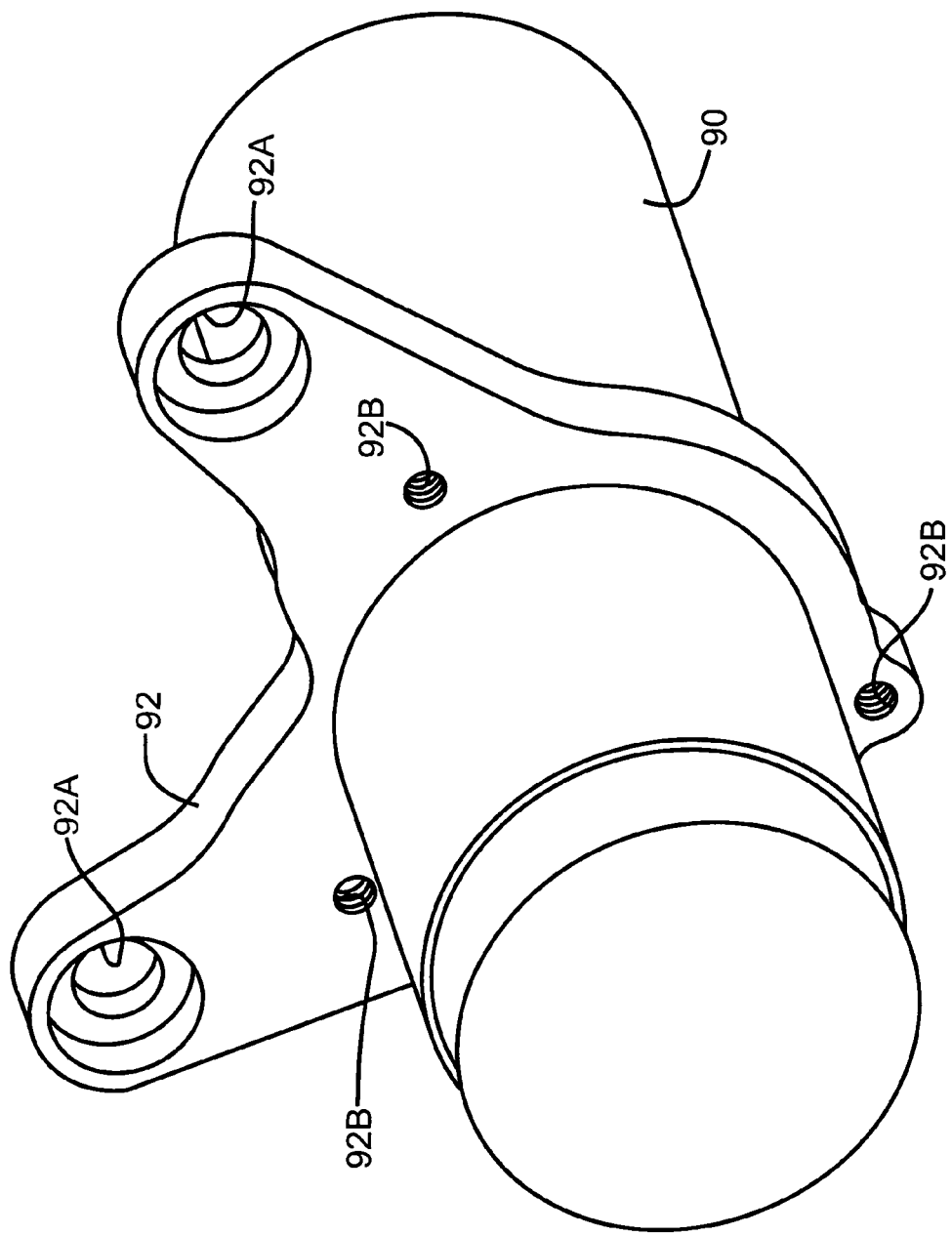
FIG. 11 is a perspective view of other selected components of the fourth embodiment of a vehicle drum-in-hat disc brake assembly illustrated in FIG. 9.

In the illustrated embodiment as shown in FIG. 10, the abutment tower 86 is preferably formed as a one piece casting and includes a main body having a first "upper" portion 100, a second "lower" portion 102, an opening 104, and a pair of opposed arms 106 and 108. The first portion 100 is provided with a key 100A and a threaded opening 100A which extends toward the opposite end thereof. The second portion 102 is interconnected to the arms 106 and 108 and is provided with a first threaded hole 102A and a second non-threaded hole 102B. The arms 106 and 108 are each provided with a reduced outer diameter extension 106A and 108A, respectively, extending therefrom, for a purpose to be discussed below. The arms 106 and 108 are further each provided with a threaded opening 106B and 108B, respectively, extending therethrough.

As will be discussed below, the key 100B will assist in helping locate the abutment tower 86 into the caliper bracket assembly 94, the threaded openings 100B is provided to accommodate the abutment tower bolt 96, and the threaded openings 106B and 108B are provided to accommodate the mounting bolts 98. The hole 102B is provided to accommodate a wheel speed sensor 112 (shown in phantom in FIG. 13), and the hole 102A is provided to receive a threaded fastener (not shown) for securing the wheel speed sensor to the abutment tower 86. Alternatively, the construction, shape and/or make-up of the abutment tower 16 may be other than illustrated and described if so desired. For example, as illustrated in the embodiment of FIG. 14, an abutment tower 86' may be provided having a flanged end 100' and an opened or non-interconnected lower portion 102' for securing a wheel speed sensor 112' thereto by suitable means, such as a threaded fastener 130.

Figure 12:
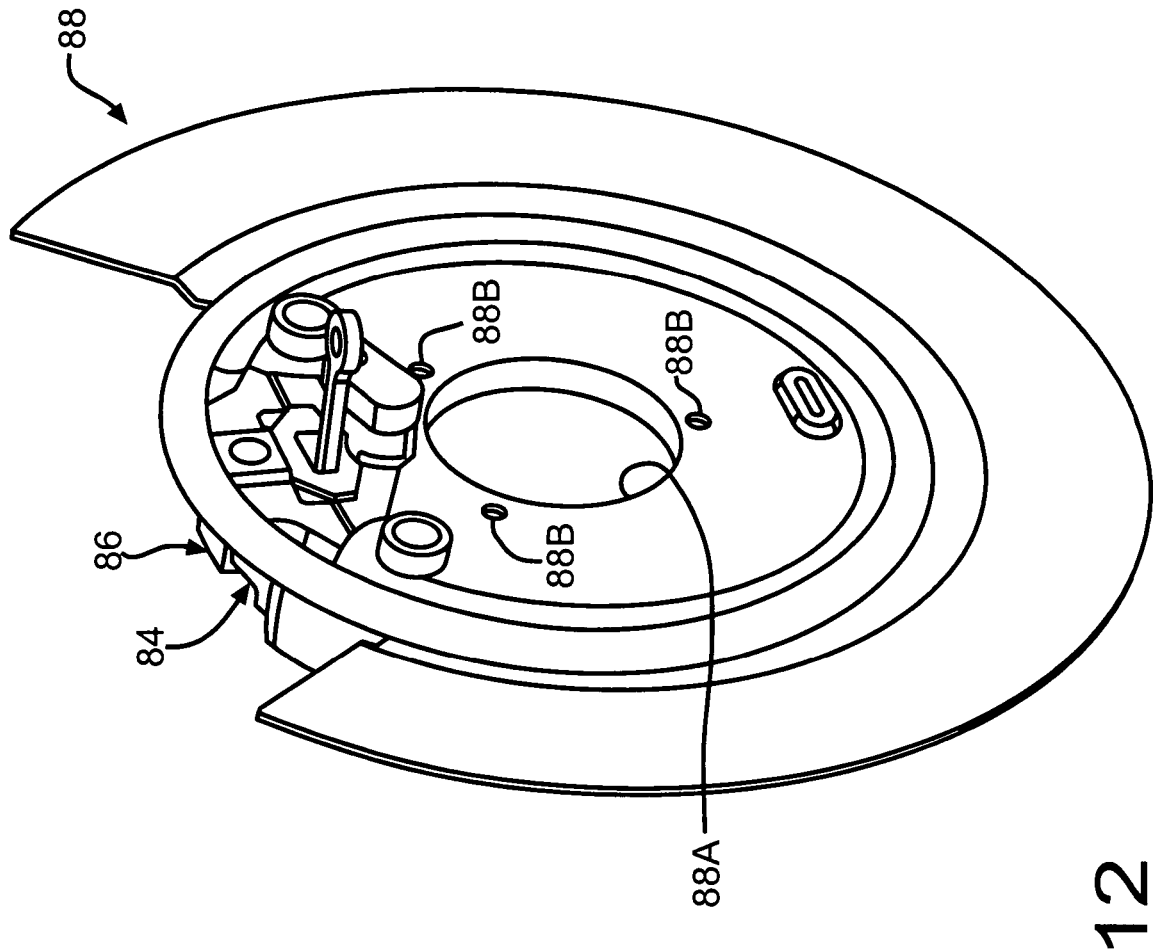
FIG. 12 is a view of selected components of the fourth embodiment of the vehicle drum-in-hat disc brake assembly illustrated in FIG. 9 partially assembled.

In the illustrated embodiment as shown in FIG. 12, the shield 88 includes a generally centrally located circular hole 88A and a plurality of smaller holes 88B. In the illustrated embodiment, the shield 88 is provided with three smaller holes 88B. Also, as illustrated in this embodiment, the shield 88 is preferably crimped to the abutment tower 86 to assist in locating the assembled drum brake assembly, indicated generally at 114 in FIG. 12, the components of which will be discussed below. Alternatively, the shield 88 may be fastened or secured to the abutment tower by other suitable means, if so desired. Alternatively, the construction, shape and/or make-up of the shield 88 may be other than illustrated and described if so desired.

In the illustrated embodiment, the axle flange 92 is secured to the axle tube 90 by suitable means, such as for example, by welding, and is provided with a first plurality of holes 92A and a second plurality of smaller threaded holes 92B. In the illustrated embodiment, the axle flange 92 is provided with two holes 92A each of which is a countersunk hole. As will be discussed below, a respective one of each of the holes 92A of the axle flange 92 is coaxial with a respective one of each of the holes 106B and 108B of the arms 106 and 108 of the abutment tower 86 and the extensions 106A and 106B of the arms 106 and 108 are adapted to be received in the countersunk portions of the holes 92A. In the illustrated embodiment, the axle flange 92 is provided with three holes 92B and a respective one of each of the holes 92B is coaxial with a respective one of each of the holes 88B of the shield 88. Alternatively, the construction, shape and/or make-up of the axle tube 90 and/or the axle flange 92 may be other than illustrated and described if so desired.

In the illustrated embodiment, as shown in FIG. 9, the caliper bracket assembly 94 includes a caliper bracket 112 and a single piston caliper assembly, indicated generally at 114. The caliper bracket 112 is preferably formed as a one piece casting and is provided with a plurality of holes 112A. In the illustrated embodiment, the caliper bracket 112 is provided with three holes 112A (only two of the holes 112A being shown in FIG. 9). As will be discussed below, two of the holes 112A are coaxial with the two holes 92A of the axle flange 92, and therefore the holes 106B and 108B of the abutment tower 86, and the other one of the holes 112A is coaxial with the hole 100B of the abutment tower 86. Alternatively, the construction, shape and/or make-up of the caliper bracket 112 may be other than illustrated and described if so desired.

The single piston caliper assembly 114 is secured to the caliper bracket 112 by suitable means. In the illustrated embodiment, the single piston caliper assembly 114 is slidably secured to the caliper bracket 112 by guide pins 116 (only one of the guide pins 116 illustrated in FIG. 9). Alternatively, the construction, shape and/or make-up of the caliper assembly 94 and/or the securement of the caliper assembly 94 to the caliper bracket 112 may be other than illustrated and described if so desired.

The assembly of the fifth embodiment of the vehicle drum-in-hat disc brake assembly 80 is somewhat similar to that described above in connection with the first embodiment of the vehicle drum-in-hat disc brake assembly 10 as described in conjunction with FIG. 8. However, as can be understood, in this embodiment the caliper bracket 112 is disposed on an inboard side 92B of the axle flange 92 and is secured thereto by the two mounting bolts 98, which extend through the holes 112A of the caliper bracket 112, through the holes 92A of the axle flange 92, and are received in the threaded holes 106B and 106A of the arms 106 and 108, respectively, of the abutment tower 86. Also, in this embodiment, the shield 88 is secured to the axle flange 92 by threaded fasteners 128 (one of the fasteners 128 shown in FIG. 9), which extend through the holes 88B of the shield 88 and are received in the threaded holes 92B of the axle flange 92. Also, in the illustrated embodiment, the drum-in-hat disc brake assembly 80 further includes a park brake cable reaction bracket 120 secured to the caliper bracket 112 by the mounting bolts 98. Preferably, the bracket 120 is crimped to the caliper bracket 112 as shown prior to shipping and assembly. Alternatively, the cable reaction bracket 120 may be formed integrally with the caliper bracket 112, such as during the casting of the caliper bracket 112.

Figure 13:
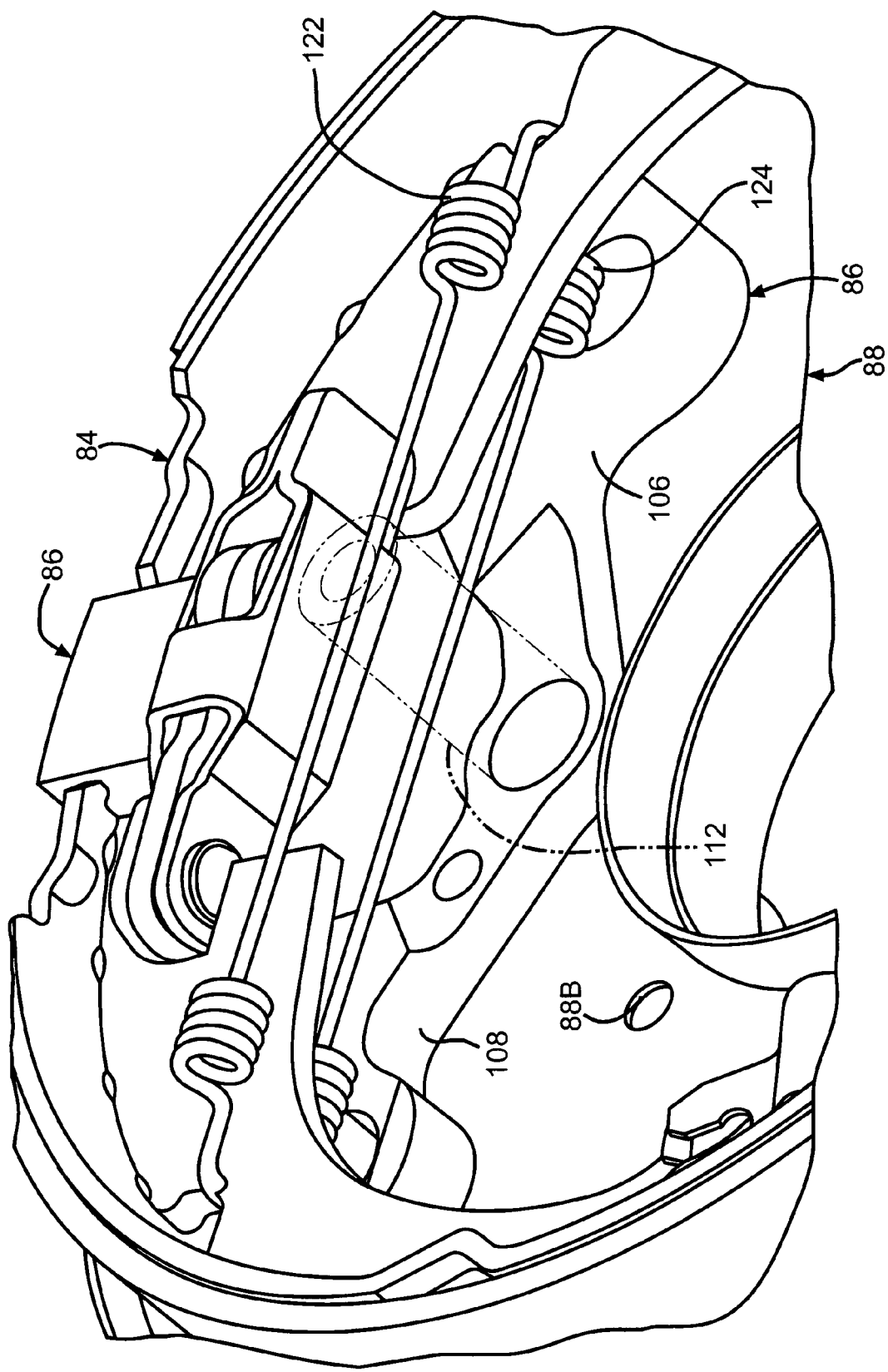
FIG. 13 is another view of selected components of the fourth embodiment of the vehicle drum-in-hat disc brake assembly illustrated in FIG. 9 partially assembled.
Figure 14:
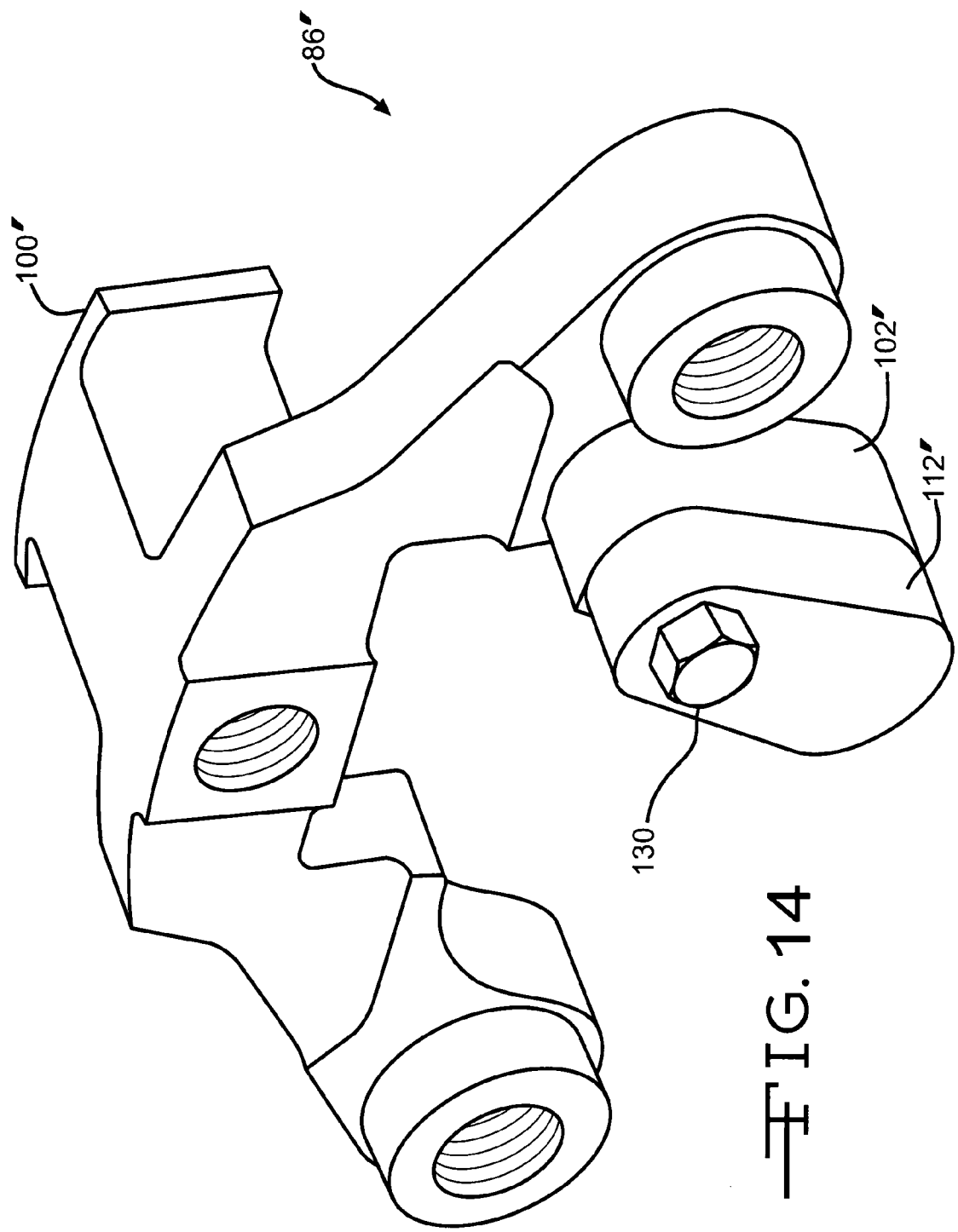
FIG. 14 is a perspective view of selected components for use in a fifth embodiment of a vehicle drum-in-hat disc brake assembly.

Also, as best shown in FIG. 13, in this embodiment a pair of two coil pack springs 122 and 124 are provided as part of the drum brake assembly 84. The springs 122 and 124 are used since the relatively tight clearance or gap between the of the wheel speed sensor 112 and an actuator mechanism 126 of the drum brake assembly 84 may not allow the use of a conventional compression coil spring. Also, as can be seen in FIG. 13, the clearance between the arms 106 and 108 of the abutment tower 86 and the springs 122 and 124 and or the shoes of the drum brake assembly 84 is relatively tight. As a result of this and in order to provide sufficient thread distance for the mounting bolts 98 to secure the components together, the arms 106 and 108 of the abutment tower 86 include the extensions 106A and 108A, respectively, which are adapted to be received in the countersunk holes 92A of the axle flange 92. Thus, the extensions 106A and 108A are operative to increase the effective thread length of the holes 106B and 108B to provide an adequate thread length for the mounting bolts 98.

One advantage of the embodiments illustrated and described herein is that a separate drum-in-hat adapter is not required for the drum-in-hat disc brake assembly. To accomplish this, all the disclosed and illustrated embodiments herein use an abutment tower which is formed separate from the caliper bracket assembly and secured thereto by suitable means. Another advantage of the disclosed and illustrated embodiments herein is that the associated caliper bracket assembly may include an outer tie bar if so desired. Also, as shown in connection with the embodiments illustrated in FIGS. 9 and/or 14, the abutment tower may be constructed so as to be adapted to receive the wheel speed sensor.

In accordance with the provisions of the patent statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle drum-in-hat disc brake assembly comprising:
   a shield adapted to be secured to an axle flange;
   a drum brake portion carried by the shield;
   an abutment tower operatively disposed with the drum brake portion; and
   a caliper bracket assembly formed separate from the abutment tower and adapted to be secured to the axle flange;
   wherein at least one first fastener is provided for securing the abutment tower to the caliper bracket assembly and a plurality of second fasteners are provided for securing the caliper bracket assembly and the shield to the axle flange;
   wherein the plurality of second fasteners include a first plurality of second fasteners which extend through openings provided in the caliper bracket, through openings provided in the axle flange, and are received in threaded openings provided in the abutment tower to secure the caliper bracket and the abutment tower to the axle flange, and a second plurality of second fasteners which extend through openings provided in the shield and are received in threaded openings provided in the axle flange to secure the shield to the axle flange.

2. The vehicle drum-in-hat disc brake assembly of claim 1 wherein the abutment tower includes at least one threaded hole for receiving the at least one first fastener for securing the abutment tower to the caliper bracket assembly.

3. The vehicle drum-in-hat disc brake assembly of claim 1 wherein the abutment tower includes a pair of arms, each arm having an extension having a reduced outer diameter and a threaded opening formed therethrough, the axle flange includes a pair of countersunk holes, and wherein the reduced outer diameter extensions are disposed in the countersunk holes.

4. The vehicle drum-in-hat disc brake assembly of claim 1 wherein the abutment tower includes a portion for attaching a wheel speed sensor.

5. The vehicle drum-in-hat disc brake assembly of claim 1 wherein the caliper bracket assembly includes a slot and the abutment tower includes a key which is adapted to be guided in the slot to assist in the mating of the abutment tower to the caliper bracket assembly during assembly.

6. The vehicle drum-in-hat disc brake assembly of claim 1 wherein the caliper bracket assembly includes a caliper bracket and a piston caliper assembly.

7. The vehicle drum-in-hat disc brake assembly of claim 6 wherein the caliper bracket is disposed on an inboard side of the axle flange.

8. A method for producing a vehicle drum-in-hat disc brake assembly comprising the steps of:
   (a) providing an assembled drum brake assembly including a shield adapted to be secured to an axle flange of an axle, a drum brake portion carried by the shield, and an abutment tower operatively disposed with the drum brake portion;
   (b) providing a caliper bracket assembly formed separate from the abutment tower of the assembled drum brake assembly provided in step (a);
   (c) installing the assembled drum brake assembly on the axle;
   (d) installing a brake rotor on the axle;
   (e) installing the caliper bracket assembly on the axle;
   (f) providing at least one first fastener for securing the abutment tower to the caliper bracket assembly; and
   (g) providing a plurality of second fasteners for securing the caliper bracket assembly and the shield to the axle flange, wherein the plurality of second fasteners include a first plurality of second fasteners which extend through openings provided in the caliper bracket, through openings provided in the axle flange, and are received in threaded openings provided in the abutment tower to secure the caliper bracket and the abutment tower to the axle flange, and a second plurality of second fasteners which extend through openings provided in the shield and are received in threaded openings provided in the axle flange to secure the shield to the axle flange.

9. The method of claim 8 wherein the abutment tower includes at least one threaded hole for receiving the at least one first fastener for securing the abutment tower to the caliper bracket assembly.

10. The method of claim 8 wherein the abutment tower includes a pair of arms, each arm having an extension having a reduced outer diameter and a threaded opening formed therethrough, the axle flange includes a pair of countersunk holes, and wherein the reduced outer diameter extensions are disposed in the countersunk holes.

11. The method of claim 8 wherein the caliper bracket assembly includes a slot and the abutment tower includes a key which is adapted to be guided in the slot to assist in the mating of the abutment tower to the caliper bracket assembly during assembly.

* * * * *